United States Patent
Flory et al.

(10) Patent No.: US 6,773,074 B2
(45) Date of Patent: Aug. 10, 2004

(54) VEHICLE SEAT HAVING A FOOTREST

(75) Inventors: Gerhard Flory, Boeblingen (DE); Guenter Franzmann, Rockenhausen (DE); Hermann Gaus, Stuttgart (DE); Thomas Geisel, Rottenburg (DE); Klaus Hassler, Mehlbach (DE); Christoph Jung, Herrenberg (DE); Rainer Leucht, Baltmannsweiler (DE); Heiko Utsch, Kaiserslautern (DE); Erik Weber, Bedesbach (DE); Norman Windham, Boerrstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/379,449

(22) Filed: Mar. 4, 2003

(65) Prior Publication Data

US 2003/0209933 A1 Nov. 13, 2003

(30) Foreign Application Priority Data

Mar. 4, 2002 (DE) .......................................... 102 09 186

(51) Int. Cl.$^7$ ................................................ A47C 20/00
(52) U.S. Cl. ............................ 297/423.34; 297/423.36; 297/284.11; 297/423.28; 297/423.26
(58) Field of Search ....................... 297/423.21, 423.22, 297/423.23, 423.24, 423.26, 423.28, 423.34, 423.36, 354.13

(56) References Cited

U.S. PATENT DOCUMENTS

| | | | | | |
|---|---|---|---|---|---|
| 4,635,999 A | * | 1/1987 | Simpson | ....................... | 297/88 |
| 4,678,229 A | * | 7/1987 | Ryan et al. | .................... | 297/68 |
| 4,819,987 A | * | 4/1989 | Stringer | ................. | 297/423.35 |
| 5,352,020 A | * | 10/1994 | Wade et al. | ........... | 297/423.26 |
| 5,354,116 A | * | 10/1994 | May et al. | ..................... | 297/85 |
| 5,447,359 A | * | 9/1995 | Asbjornsen et al. | ... | 297/423.35 |
| 6,227,489 B1 | * | 5/2001 | Kitamoto et al. | ........ | 244/118.5 |
| 6,494,536 B2 | * | 12/2002 | Plant | ..................... | 297/284.11 |
| 6,652,033 B2 | * | 11/2003 | Satoh | ....................... | 297/423.3 |
| 2002/0063449 A1 | * | 5/2002 | Plant | ........................... | 297/68 |

FOREIGN PATENT DOCUMENTS

| | | |
|---|---|---|
| DE | 92 00 777.5 | 5/1992 |
| EP | 0 539 444 | 9/1995 |

* cited by examiner

Primary Examiner—Peter M. Cuomo
Assistant Examiner—Erika Garrett
(74) Attorney, Agent, or Firm—Kenyon & Kenyon

(57) ABSTRACT

A vehicle seat includes a lower-leg support, transferable from a stowed position into a utilization position, and a footrest. To achieve comfortable support with easy operation, the footrest has a footplate that may be folded out and that is located in the stowed position approximately parallel, and in the utilization position approximately perpendicular, to the lower-leg support, and coacts with an energy storage device.

20 Claims, 3 Drawing Sheets

VEHICLE SEAT HAVING A FOOTREST

CROSS-REFERENCE TO RELATED APPLICATIONS

The present application claims priority to Application No. 102 09 186.2, filed in the Federal Republic of Germany on Mar. 4, 2002, which is expressly incorporated herein in its entirety by reference thereto.

FIELD OF THE INVENTION

The present invention relates a vehicle seat.

BACKGROUND INFORMATION

A vehicle seat is described in European Published Patent Application No. 0 539 444. This vehicle seat has a footrest that is foldable from a stowed position located under the seat into a utilization position. The footrest has a resting surface, subdivided into several subsections, for a seat occupant's lower legs. Individual sections of this surface can be raised in order to obtain a resting surface for supporting the feet. This footrest requires a relatively large amount of space in the stowed position, however. In addition, the support for the seat occupant is uncomfortable and cumbersome to operate.

German Utility Model No. G 92 00 777.5 describes a bus seat having a footrest. The footrest is articulated on the seat cushion of the bus seat by a parallelogram arm linkage acted upon by a gas spring. By the parallelogram arm linkage, the footrest can be folded from a stowed position located beneath the seat cushion into a utilization position. The disadvantage here is that once again, the footrest requires a relatively large amount of space in the stowed position and is relatively cumbersome to operate with less-comfortable support for the seat occupant.

It is an object of the present invention to provide a vehicle seat that may be of compact configuration, may offer comfortable support of the legs and feet, and may be easy to operate.

SUMMARY

The above and other beneficial objects of the present invention may be achieved by providing a vehicle seat as described herein.

According to an example embodiment, the vehicle seat has a footrest with footplate that is positioned at the lower end of a lower-leg support. The lower-leg support may have a padded resting surface for supporting the lower legs of a seat occupant. The footplate is foldable about a rotation axis extending transversely to the lower-leg support, so that it is pivotable from a stowed position located approximately parallel to the lower-leg support into a utilization position located approximately perpendicular to the lower-leg support. In the stowed position, the footrest may require very little space. In the utilization position, the footrest offers comfortable support and bracing for the seat occupant's feet. For simple and convenient operation, the footrest may have an energy storage device that is charged as the footplate is folded out from the stowed position.

Provision is made for the footplate to have a snap-lock apparatus and for it to be able to snap-lock in the utilization position. The snap-lock apparatus retains the footplate against the force of the energy storage device. After the snap-lock apparatus is released, it automatically pivots into the stowed position as the energy storage device discharges. The result may be simple operation of the footplate. At the same time, the footplate may require little physical volume in the stowed position.

The footplate is connected to a lower-leg support that may be adjusted in automatically driven fashion. Provision is made for adjusting the length and/or tilt of the lower-leg support in automatically driven fashion. The lower-leg support may be moved steplessly by a drive from the stowed position into a utilization position and back. By adjustment of the length and/or tilt of the lower-leg support, the position of the footrest may be adapted to the seat occupant's body dimensions and/or to the desired utilization position.

In an example embodiment, provision is made for the snap-lock apparatus to have an overload protector. It may be configured in overrunnable fashion. For example, if the folded-out footplate comes into contact with an obstacle as the lower-leg support is being adjusted, the snap-lock apparatus may be overrun and the energy storage device may fold the footplate back into the stowed position. This may prevent inadvertent trapping of or damage to objects and/or vehicle occupants.

In order to reduce the risk of injury in a crash, provision is made for the footplate to have a defined break point. This may be located at the connection to the lower-leg support. If the seat occupant's feet strike the footplate with a great deal of force as a result of a crash, the footplate may then yield and/or break off at the defined break point before the feet are injured.

In an example embodiment, provision is made for the footplate to be covered with a upholstery material and/or carpet, and/or to be padded or to have an insert made of upholstery material and/or carpet, so that the feet are comfortably supported. The footplate may thereby be integrated into the design of the interior and may have a pleasant appearance. At the same time, the footplate is padded by the upholstery material and/or carpet so that the feet are comfortably supported.

It is possible to use the vehicle seat according to the present invention in passenger cars, in buses, and in watercraft or rail vehicles, etc. Use of the vehicle seat according to the present invention as a comfortable passenger seat in aircraft is also provided for.

Further features and example embodiments of the present invention are described below with reference to the Figures. The features and feature combinations described above and described below are usable not only in the particular combination indicated but also in other combinations or in isolation, without departing from the scope of the present invention.

Further example embodiments of the present invention are illustrated in and explained with reference to the Figures.

DETAILED DESCRIPTION

Figure 1:
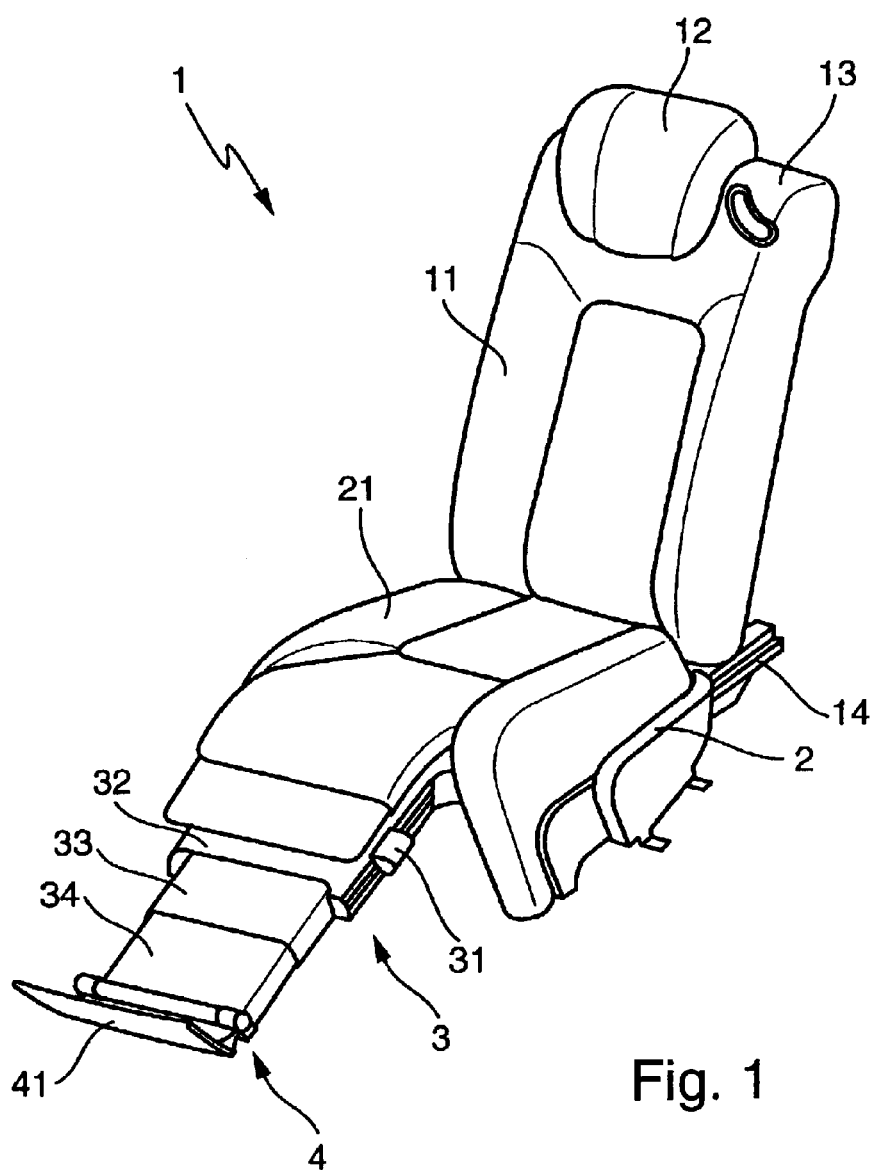
FIG. 1 illustrates the vehicle seat with a lower-leg support and footrest, in a utilization position.

FIG. 1 illustrates vehicle seat 1 with footrest 4. It has a seatback 11 with headrest 12, and a seat cushion 2 with lower-leg support 3. Vehicle seat 1 is mounted in a vehicle, e.g., in the back-seat area of a passenger car, displaceably by rails 14. A belt receptacle 13 for a three-point belt is integrated into seatback 11. Seatback 11 and seat cushion 2 each have a pad with an upholstery material, e.g., leather. Seat cushion pad 21 acts as padding for the seat cushion and lower-leg support 3, and is arranged continuously. It constitutes an uninterrupted padded seat surface.

In the resting or utilization position illustrated in FIG. 1, lower-leg support 3 is pulled out toward the front. It was pivoted up and forward and extended in order to enlarge its resting surface for the lower legs. The lower-leg support has a three-part telescope having an upper telescope element 32, a middle telescope element 33, and a lower telescope element 34. In order to vary the length of lower-leg support 3, telescope elements 32, 33, 34 may be telescoped by an electric drive. Positioned at the lower end of lower-leg support 3 is footrest 4. It is joined to lower telescope element 34 and has a footplate 41 that, in the utilization position, is folded out and offers a comfortable support for the feet. Footplate 41 is pivotable about a rotation axis extending transversely to lower-leg support 3, and in the utilization position is approximately perpendicular to lower-leg support 3.

In addition to the resting or reclining position illustrated in FIG. 1, vehicle seat 1 also has further seat positions, e.g., also an upright seat position with lower-leg support 3 pulled in and footrest 4 folded in.

Figure 2:
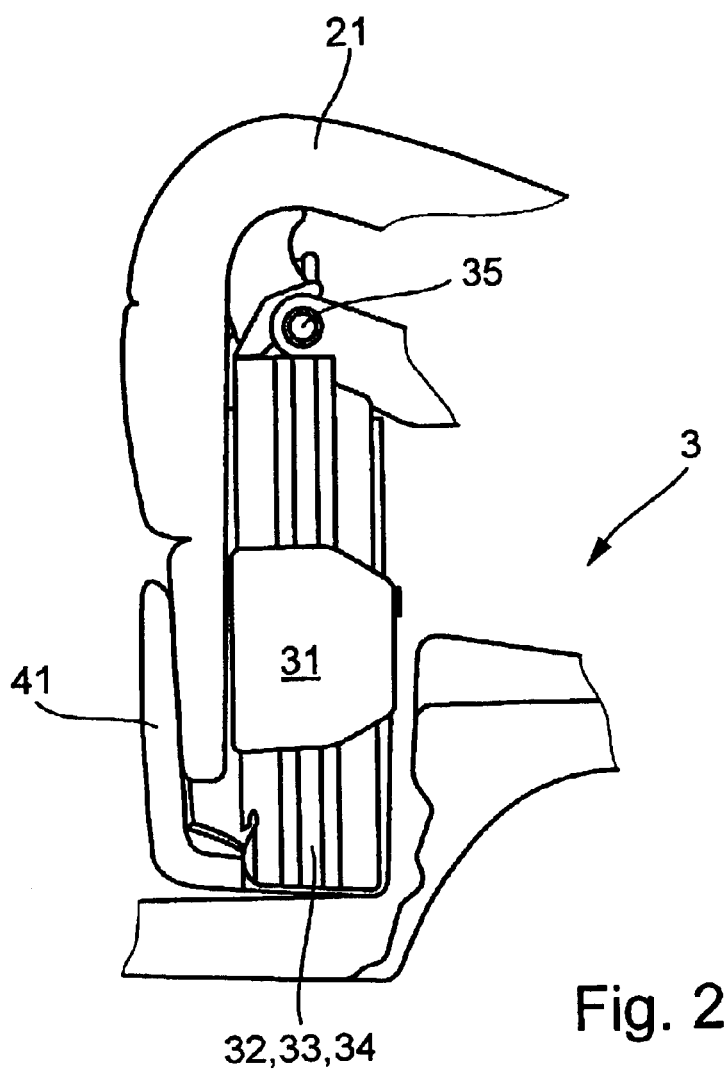
FIG. 2 is a cross-sectional view of the lower-leg support and footrest in the stowed position.

The stowed position, with lower-leg support 3 pulled in and footrest 4 folded in, is illustrated in FIG. 2. Telescope elements 32, 33, 34 of lower-leg support 3 are slid into one another and positioned at the front end of seat cushion 2, oriented approximately vertically downward. Positioned on upper telescope element 32 is a tilt adjuster 35 that joins lower-leg support 3 to seat cushion 2. Tilt adjuster 35 has an electric motor for adjusting the tilt of lower-leg support 3.

Footplate 41 is positioned parallel to lower-leg support 3 and constitutes, together with seat pad 21, a flat front surface that closes off the vehicle seat at the front. The back side of footplate 41 is flush with the upper side of seat pad 21, so that the vehicle seat has no protruding edges and/or so that footplate 41 may not inadvertently be folded out. Lower-leg support 3 and footrest 4 are in the stowed position, positioned in contact against the front region of seat cushion 2. This stowed position is space-saving, and does not interfere with the foot room present in the vehicle.

Figure 3:
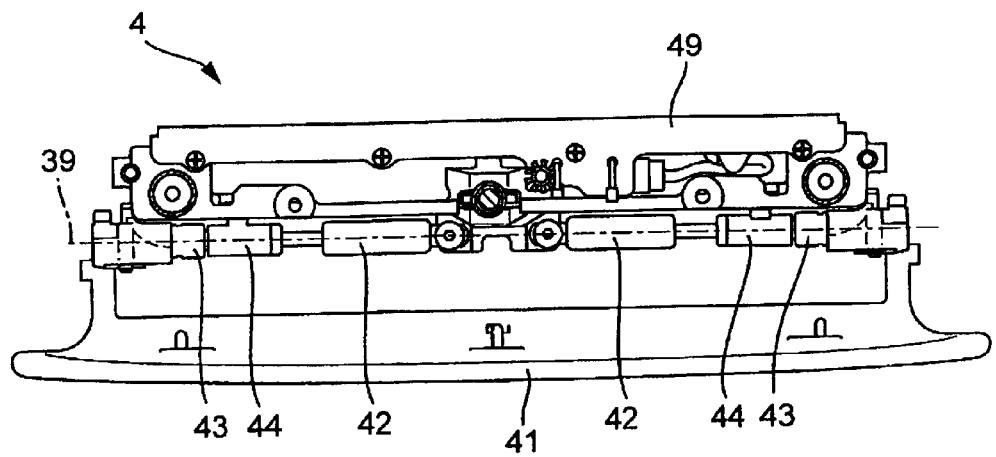
FIG. 3 schematically illustrates the configuration of the footrest.
Figure 4:
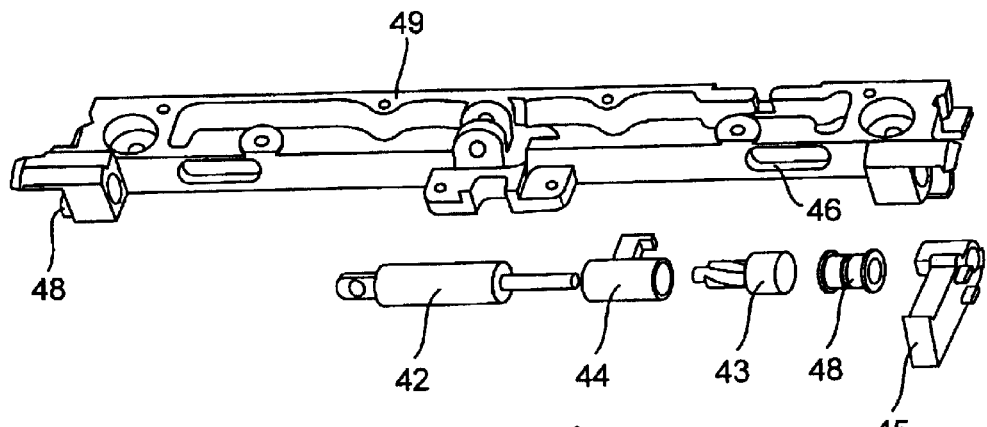
FIG. 4 is an exploded view of individual parts of the footrest.

The construction of footrest 4 is illustrated in FIG. 3. FIG. 4 illustrates parts of the foot rest in an exploded view. Footrest 4 has a cross brace 49. Footrest 4 is arranged in mirror-symmetrical fashion and retains footplate 41 by two pivot bearings 48. The two pivot bearings 48 are positioned on either side of cross brace 49, and form a rotation axis 39 about which footplate 41 is rotatable. Cross brace 49 retains, symmetrically and respectively on its left and its right side, an energy storage device 42, a threaded spindle 43, and a nut 44.

Energy storage device 42 has a spring and a damping element coacting therewith. Energy storage device 42 coacts with nut 44, which is mounted displaceably along rotation axis 39 by a guide arm 47 engaging into an elongated guide groove 46 positioned on cross brace 49. Guide arm 47 prevent any rotational motion of nut 44, and guides the latter linearly along guidance groove 46. Nut 44 meshes with a threaded spindle 43 that is joined nonrotatably to footplate 41 via a connecting lever 45. Energy storage device 42 and threaded spindle 43 and nut 44 are positioned in rotation axis 39 of footplate 41, along an imaginary connecting line between pivot bearings 48.

Upon pivoting or folding of footplate 41 from the stowed position into the utilization position, the latter is pivoted about rotation axis 39 and thereby causes threaded spindle 43 to rotate in the same direction. The latter meshes with the displaceably mounted nut 44 and moves it, against the force of spring 42, toward the center of cross brace 49. When the utilization position has been reached, the end face of nut 44 snaps into place and retains footplate 41 against the force of spring 42.

When the snap-lock connection is then disengaged and/or overrun in order to pivot the footplate back, spring 42 then acts on nut 44 and pushes it outwardly, damped by the damper element. Nut 44 thus meshes with threaded spindle 43 and rotates it, together with footplate 41, in the opposite direction, so that footplate 41 may automatically fold into the stowed position.

What is claimed is:

1. A vehicle seat, comprising:
    a seat cushion;
    a lower-leg support pivotably attached on the seat cushion and movable between a stowed position and a utilization position, the lower-leg support including a footrest at a lower end, the footrest including a footplate foldable about a rotation axis arranged transversely to the lower-leg support and located in the stowed position approximately parallel to the lower-leg support and located in the utilization position approximately perpendicular to the lower leg support; and
    an energy storage device, the footplate joined to the energy storage device and configured to charge the energy storage device upon folding out from the stowed position into the utilization position.

2. The vehicle seat according to claim 1, wherein the lower-leg support is automatically drivable between the stowed position and the utilization position.

3. The vehicle seat according to claim 1, wherein the footrest includes a snap-lock apparatus configured to snap-lock the footplate in the utilization position.

4. The vehicle seat according to claim 3, wherein the footplate is configured to automatically fold into the stowed position after release of the snap-lock apparatus in accordance with discharge of the energy storage device.

5. The vehicle seat according to claim 1, wherein the energy storage device is arranged in a region of the rotation axis of the footplate.

6. The vehicle seat according to claim 1, wherein the rotation axis of the footplate extends through the energy storage device.

7. The vehicle seat according to claim 1, wherein the footrest includes a threaded spindle joined nonrotatably to the footplate and meshed with a nut nonrotatably mounted and arranged to be acted upon by the energy storage device, the spindle arranged to guide the nut longitudinally displaceably along the rotation axis.

8. The vehicle seat according to claim 7, wherein the threaded spindle is arranged to extend along the rotation axis of the footplate.

9. The vehicle seat according to claim 3, wherein the snap-lock apparatus is overrunnably arranged so that the snap-lock apparatus can be overrun, and wherein, when the snap-lock apparatus is overrun, the footplate, acted upon by the energy storage device, automatically folds into the stowed position.

10. The vehicle seat according to claim 1, wherein the footplate is connected to the lower-leg support via a defined break point.

11. The vehicle seat according to claim 1, wherein the lower-leg support includes a padded surface.

12. The vehicle seat according to claim 3, wherein the snap-lock apparatus snap-locks the footplate against a force of the energy storage device.

13. The vehicle seat according to claim 1, wherein the lower-leg support is adjustable between a first length and a second length, and the lower-leg support is automatically drivable between the first length and the second length.

14. The vehicle seat according to claim 10, wherein the footplate rotates from the utilization position in a direction opposite to the stowed position when at the defined break point.

15. The vehicle seat according to claim 1, wherein the energy storage device includes a spring.

16. The vehicle seat according to claim 1, wherein the footplate includes a padded surface.

17. The vehicle seat according to claim 1, wherein the seat cushion is mounted on at least one rail and is axially movable about the at least one rail.

18. The vehicle seat according to claim 1, wherein a single padded surface extends across the seat cushion and the lower-leg support.

19. The vehicle seat according to claim 1, wherein the lower-leg support includes overlapping sections that are telescopically adjustable.

20. The vehicle seat according to claim 1, wherein the utilization position includes a first and a second utilization position, and the lower-leg support is tiltable between the first and second utilization positions.

* * * * *